United States Patent
Kotfis et al.

(10) Patent No.: US 10,785,418 B2
(45) Date of Patent: Sep. 22, 2020

(54) GLARE REDUCTION METHOD AND SYSTEM

(71) Applicant: Bossa Nova Robotics IP, Inc., Pittsburgh, PA (US)

(72) Inventors: Dave Kotfis, Castle Shannon, PA (US); Stephen Williams, Pittsburgh, PA (US)

(73) Assignee: BOSSA NOVA ROBOTICS IP, INC., Pittsburgh, PA (US)

( * ) Notice: Subject to any disclaimer, the term of this patent is extended or adjusted under 35 U.S.C. 154(b) by 504 days.

(21) Appl. No.: 15/634,993

(22) Filed: Jun. 27, 2017

(65) Prior Publication Data

US 2018/0020145 A1 Jan. 18, 2018

Related U.S. Application Data

(60) Provisional application No. 62/361,396, filed on Jul. 12, 2016.

(51) Int. Cl.
| | |
|---|---|
| *H04N 5/247* | (2006.01) |
| *H04N 5/225* | (2006.01) |
| *H04N 5/235* | (2006.01) |
| *H04N 5/232* | (2006.01) |
| *G06Q 10/08* | (2012.01) |

(52) U.S. Cl.
CPC ......... *H04N 5/2352* (2013.01); *G06Q 10/087* (2013.01); *H04N 5/2253* (2013.01); *H04N 5/2256* (2013.01); *H04N 5/2258* (2013.01); *H04N 5/2351* (2013.01); *H04N 5/2354* (2013.01); *H04N 5/23238* (2013.01); *H04N 5/247* (2013.01)

(58) Field of Classification Search
None
See application file for complete search history.

(56) References Cited

U.S. PATENT DOCUMENTS

| | | | |
|---|---|---|---|
| 2012/0116632 A1* | 5/2012 | Bechtel | B60Q 1/1423 701/36 |
| 2015/0363758 A1* | 12/2015 | Wu | G06K 9/00664 705/20 |
| 2016/0267304 A1* | 9/2016 | Wu | G06K 7/10732 |
| 2016/0267305 A1* | 9/2016 | Lei | G06K 7/10851 |

* cited by examiner

*Primary Examiner* — Dave Czekaj
*Assistant Examiner* — Samuel D Fereja
(74) *Attorney, Agent, or Firm* — David R. Stevens; Stevens Law Group

(57) ABSTRACT

A method for decreasing glare in images begins with providing cameras and lights mounted on a movable base and directable at a target. The position, orientation, intensity, and intensity distribution of lights directed at the target is then determined. This information is used to estimate illumination received by cameras based in part on target reflectance characteristics. The light intensity and selected illumination levels necessary to prevent glare creation in images captured by cameras can be selectively varied, being decreased to prevent overexposure and increased to prevent underexposure.

25 Claims, 8 Drawing Sheets

GLARE REDUCTION METHOD AND SYSTEM

RELATED APPLICATIONS

This application claims the benefit of U.S. Provisional Application Ser. No. 62/361,396 filed Jul. 12, 2016, which is hereby incorporated herein by reference in its entirety for all purposes.

TECHNICAL FIELD

The present disclosure relates generally to a method for reducing glare in images. In certain embodiments, panoramas can be created from images that are captured by a camera and lighting system that automatically reduces selected light intensity to ensure that camera images are not overexposed.

BACKGROUND

Producing detailed images using lights substantially fixed with respect to a camera can be difficult, especially when a camera target can include glass, mirror-like or highly reflective surfaces. "Hot spots", glare, or overexposed areas in an image can obscure target details.

One use of machine vision systems that would greatly benefit from reduced glare is shelf space monitoring of retail stores or warehouses. Such stores can contain thousands of distinct products that are often sold, removed, added, or repositioned, requiring regular image monitoring. For example, large numbers of fixed position cameras can be used throughout a store to monitor aisles. Alternatively, a smaller number of movable cameras can be used to scan a store aisle. Even with such systems, human intervention is often required when image glare obscures a product, or when resolution is not adequate to determine product identification number or product count. Metal cans, products with highly reflective sections, or products curved in a manner that concentrates reflected light can easily create unwanted glare.

SUMMARY

A method for decreasing glare in images begins with providing cameras and lights mounted on a movable base and directable at a target. The position, orientation, intensity, and intensity distribution of lights directed at the target is then determined. This information is used to estimate illumination received by cameras based in part on target reflectance characteristics. The light intensity and selected illumination levels necessary to prevent glare creation in images captured by cameras can be selectively varied, being decreased to prevent overexposure and increased to prevent underexposure. The cameras and associated lights can be moved to capture multiple images of a target from various viewpoints, with the images being stitched together to create a panorama.

In certain embodiments, ambient light can be estimated, improving illumination estimates. In other embodiments estimating illumination includes estimating illumination intensity at each camera pixel. Glare intensity per pixel of a camera(s) can be determined by dividing i) estimated illumination intensity at each camera pixel by ii) glare illumination. Estimating illumination can be even further improved by incorporation of a reflection model.

Once illumination of the camera(s) has been estimated, the information can be used to determine an optimal level of light intensity. Selected illumination levels can be reduced to a light level selected to be between camera over exposure and camera under exposure. Decrease (or increase) in illumination levels can involve use of individually controlled lights capable of changing at least one of position, orientation, intensity, and intensity distribution. In certain embodiments, an image panorama based on multiple images can be created, with blending based on a weighted function including glare intensity per pixel.

Another disclosed embodiment is a camera system for inventory monitoring that includes a movable base. Multiple cameras can be supported by the movable base, with the multiple cameras being directable toward a target such as inventory, including products on a shelf. An image processing module is connected to the multiple cameras and able to use previously determined position, orientation, intensity, and intensity distribution of lights directed at inventory to estimate illumination received by the multiple cameras. Based on the estimated illumination, light intensity and selected illumination levels can be decreased to prevent glare creation in images captured by cameras.

In other embodiments, a glare reduction system capable of capturing multiple images of a target from various viewpoints, with the images being stitched together to create a panorama, is used for real time (or near real time) inventory management. Multiple cameras supported by the movable base are directable toward shelves or other systems for holding products or inventory. A processing module is connected to the multiple cameras and able to construct from the camera derived images an updateable map of product or inventory position. Because it represents the real distribution of products on the shelf, this map is known as a "realogram" to distinguish from conventional "planograms" that take the form of 3D models, cartoons, diagrams or lists that show how and where specific retail products and signage should be placed on shelves or displays. Realograms can be locally stored with a data storage module connected to the processing module. A communication module can be connected to the processing module to transfer realogram data to remote locations, including store servers or other supported camera systems, and additionally receive inventory information including planograms to aid in realogram construction. In addition to realogram mapping, this system can be used detect out of stock products, find label locations, read pricing, measure shelf height, and determine signage bring up and bring down times.

In one embodiment, the movable base can be a manually pushed or guidable cart. Alternatively, the movable base can be a tele-operated robot, or in preferred embodiments, an autonomous robot capable of guiding itself through a store or warehouse. Depending on size of the store or warehouse, multiple autonomous robots can be used. Aisles can be regularly inspected to create realograms, with aisles having high product movement being inspected more often.

To simplify image processing and provide accurate results, the multiple cameras are typically positioned a set distance from the shelves during the inspection process. The shelves can be lit with an array of LED or other directable light sources positioned near the cameras. The multiple cameras can be linearly mounted in vertical, horizontal, or other suitable orientation on a camera support. In some embodiments, to reduce costs, multiple cameras are fixedly mounted on a camera support. Such cameras can be arranged to point upward, downward, forward, backward, or level with respect to the camera support and the shelves. In certain embodiments, cameras can be arranged to rotate with respect to adjacent positioned LEDs and/or a normal line as defined between target shelf and the camera. Typically, camera rotation can be about a vertical axis, but rotation can also be in multiple axes, or non-vertical axes. Similarly, LEDs can be arranged to point upward, downward, forward, backward, or level with respect to the camera, as well as being rotated at defined angles. Use of one or more of the foregoing techniques advantageously permits a reduction in glare from products and shelving fixtures having highly reflective surfaces by orienting cameras out of the way of reflected light paths. In addition, multiple cameras with overlapping fields of view can result in at least one image with little or no glare. In still other embodiments, based on the estimated illumination, light intensity and selected illumination levels can be decreased to prevent glare creation in images captured by cameras.

In other embodiments, the cameras can include one or more movable cameras, zoom cameras, focusable cameras, wide-field cameras, infrared cameras, or other specialty cameras to aid in product identification or image construction, reduce power consumption, and relax the requirement of positioning the cameras at a set distance from shelves. For example, a wide-field camera can be used to create a template into which data from higher resolution cameras with a narrow field of view are mapped. As another example, a tilt controllable, high resolution camera positioned on the camera support can be used to detect shelf labels and their content, including the price and product name, and decode their barcodes.

DETAILED DESCRIPTION

Figure 1:
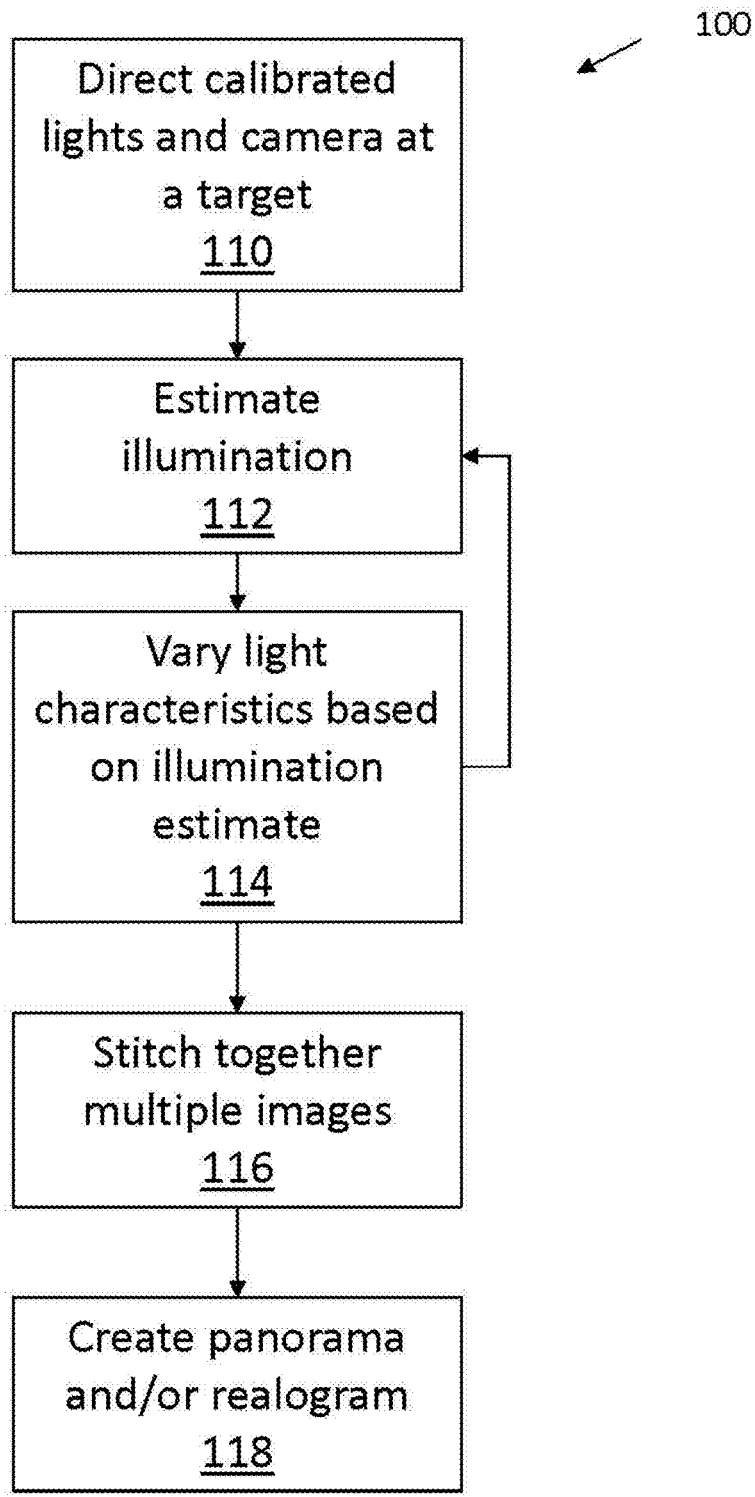
FIG. 1 is a flow chart illustrating a glare reduction method.

FIG. 1 illustrates a lighting and image capture method that allows for reduction of glare in imagery. When capturing images, it can sometimes be necessary to use lighting to illuminate the subject of such imagery. Advantageously, the disclosed lighting and image capture method and system allows for reduction in glare present in composite or stitched images by identifying glared pixels in source images and de-emphasizing the glared pixels in the image panorama. To further improve viewability of images in the image panorama, respective light intensities in captured images can be adjusted to decrease overexposure.

As seen in flow chart 100, a method for decreasing glare in images begins with providing calibrated cameras and lights (typically mounted on a movable base) and directable at a target (step 110). The position, orientation, intensity, and intensity distribution of lights directed at the target is used to estimate illumination received by cameras, based in part on target reflectance characteristics (step 112). The light intensity and selected illumination levels necessary to prevent glare creation in images captured by cameras can be selectively varied, being decreased to prevent overexposure and increased to prevent underexposure (step 114). This process can be repeated, with cameras and associated lights moved to capture multiple images of a target from various viewpoints (step 116), with the images being stitched together to create a panorama or realogram.

Figure 2:
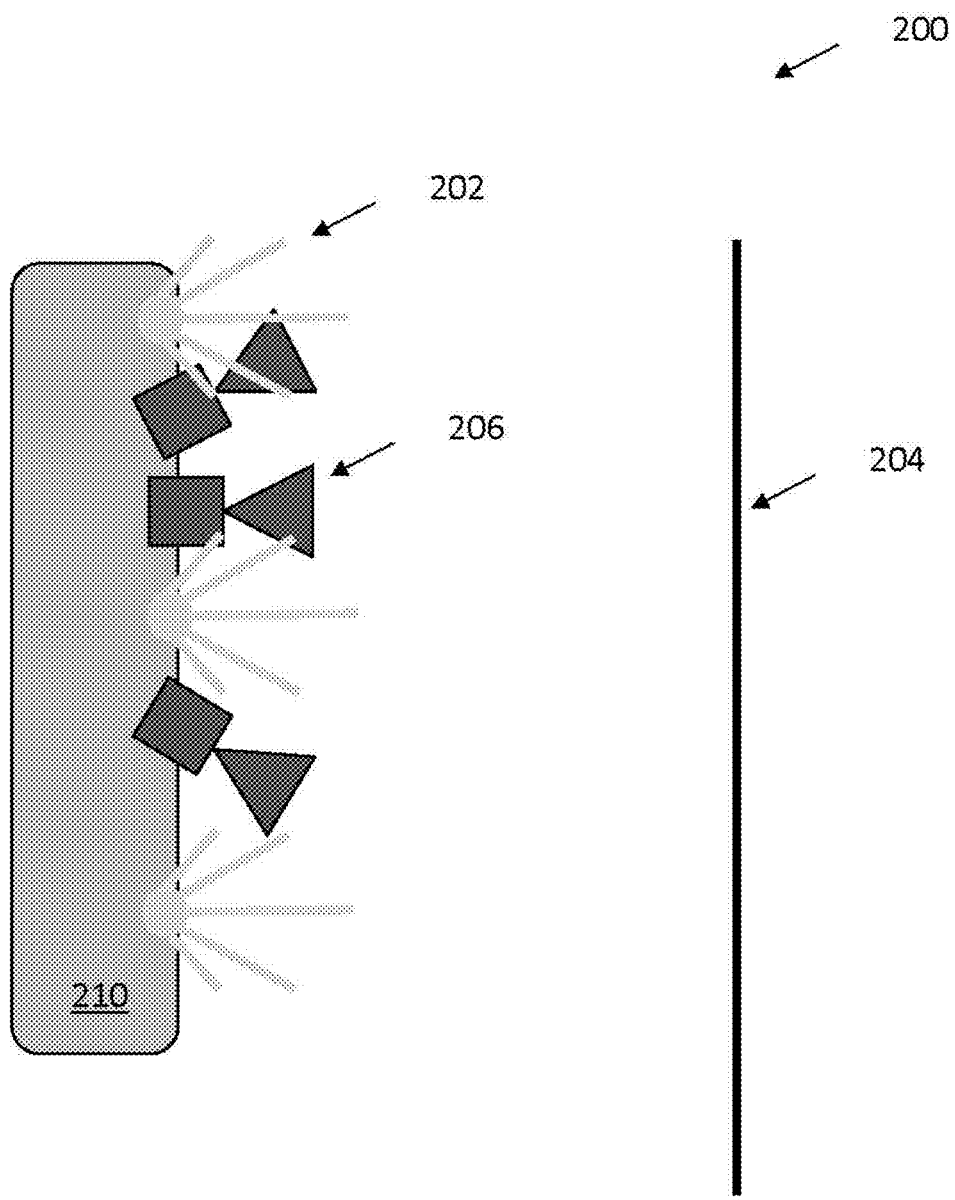
FIG. 2 illustrates a system having fixed orientation cameras and fixed orientation lights.

A system 200 for practice of the foregoing described method is illustrated with respect to FIG. 2. The position, orientation, intensity, and intensity distribution of lights 202 directed at the target 204 is used to estimate illumination received by cameras, based in part on target reflectance characteristics. The light intensity and selected illumination levels necessary to prevent glare creation in images captured by cameras can be selectively varied, being decreased to prevent overexposure and increased to prevent underexposure.

Cameras 206 can include one or more movable cameras, zoom cameras, focusable cameras, wide-field cameras, infrared cameras, or other specialty cameras to aid in product identification or image construction. For example, a wide-field camera can be used to create an image organizing template into which data from higher resolution cameras with a narrow field of view are mapped. As another example, a tilt controllable, high resolution camera positioned on the camera support roughly at a height of a shelf lip can be used to read shelf attached bar codes, identifying numbers, or labels. In certain embodiments, conventional RGB CMOS or CCD sensors can be used, alone or in combination with spectral filters that may include narrowband, wideband, or polarization filters. Embodiments can also include sensors capable of detecting infrared, ultraviolet, or other wavelengths to allow for hyperspectral image processing. This can allow, for example, monitoring and tracking of markers, labels or guides that are not visible to people, or using flashing light in the invisible spectrum that do not induce discomfort of health risk while reducing energy consumption.

Lights 202 can may be mounted along with, or separately from, the cameras 206, and can include monochromatic or near monochromatic light sources such as lasers, light emitting diodes (LEDs), or organic light emitting diodes (OLEDs). Broadband light sources may be provided by multiple LEDs of varying wavelength (including infrared or ultraviolet LEDs), halogen lamps or other suitable conventional light source. Various spectral filters that may include narrowband, wideband, or polarization filters and light shields, lenses, mirrors, reflective surfaces, diffusers, concentrators, or other optics can provide wide light beams for area illumination or tightly focused beams for improved local illumination intensity.

According to some embodiments, cameras 206 and lights 202 can be movably mounted. For example, hinged, rail, rack and pinion, motor, linear actuator, electromagnetic piston, or other suitable actuating mechanisms used to rotate, elevate, depress, oscillate, or laterally or vertically reposition cameras or lights.

In operation, cameras 206 are controlled by an image processing unit 210. Since each light has a known position and orientation, intensity, and intensity distribution, the light sources can be calibrated against the cameras, allowing high precision position and orientation estimation despite variations in manufacturing or attachment.

Given an expected target 204 distance and known camera 206 positions and orientations, for each camera/light pair the illumination intensity at every pixel in the camera images can be estimated. 3D surface measurements can also be used to improve the reflectance model. In certain embodiments, generating range and surface normal per-pixel in the source images (by calibrating with a range measurement source such as LIDAR, TOF and estimating the 3D structure of the surface), can improve estimates of the illumination received per pixel by incorporating a reflection model (e.g. phong reflection). By adding the illumination over the light sources, the total illumination for each pixel can be estimated. This allows estimation of the glare intensity per pixel (by dividing the illumination per pixel by the expected glare illumination).

During a calibration phase with the lights 202 off, the ambient light due to non-light 202 sources can be estimated. With the known gain, range, and exposure time of the cameras 206, the expected illumination level at which cameras 206 becomes saturated can also be determined. By computing statistics of glare intensity over all of the incoming pixels, light intensity can be dynamically modified to keep the illumination level centered within the range of the cameras, reducing risk of overexposure. An optimal light intensity can be computed per light source by back-propagating the desired illumination change per pixel by factoring the contributions of individual lights. After calibration, images can be blended and stitched together to create panorama by decreasing the weight applied to pixels based on their glare intensity, and throwing out unnecessary saturated pixels. This is particularly applicable to any conventional blending approach that uses a per pixel "alpha" weight to blend a result.

As will be understood, cameras 206 and associated lights 202, optionally supported on a mobile base such as a robot and used to create panoramas, can be moved and directed toward imaging of product inventory. As previously discussed, glared pixels in images can be identified and blended or de-emphasized to form an image panorama, with light intensities being dynamically adjusted to decrease the likelihood of overexposure. This stitched together image panorama of inventory photos (and optional depth measurements) can help form or update a realogram. Realogram data is handled by an inventory data and local update module, which can transmit or receive realogram relevant information via communication system. Data can be communicated to a server local to the store, or transmitted by suitable internet or networking devices to remote company servers or cloud accessible data sites.

Figure 3A:
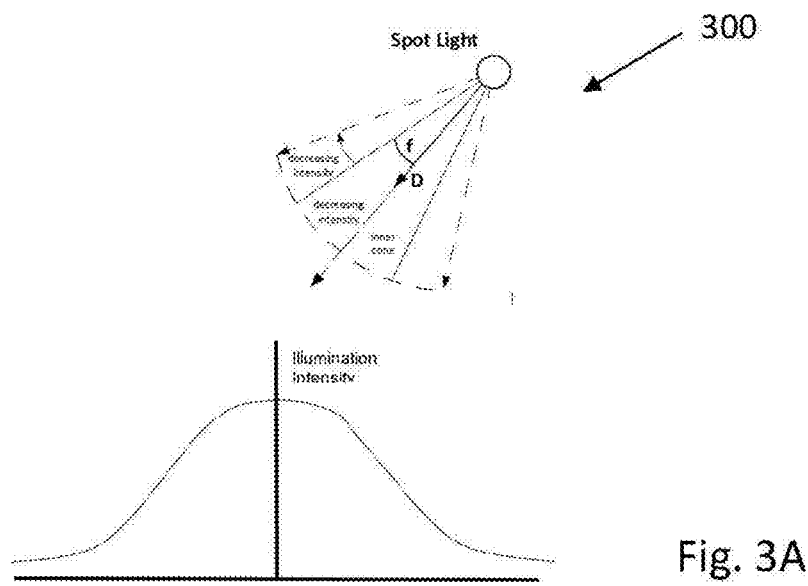
FIG. 3A is an illustration of light intensity vectors for a spot light, along with a typical Gaussian light intensity falloff from a center point.

FIG. 3A is an illustration of light intensity vectors for a spot light, along with a typical Gaussian light intensity falloff from a center point. This spotlight model involves determination a direction vector for the light source, and an attenuation model for how the light intensity decays as the angle of the outbound light vector increases. A Gaussian falloff from the center angle is most common. This model, extended for each light/camera pair, is used to estimate illumination intensity on a camera sensor after reflection from a target.

Figure 3B:
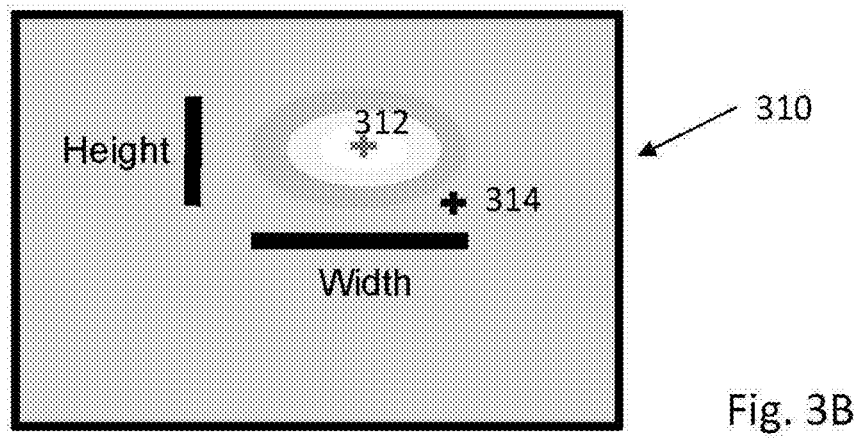
FIG. 3B illustrates a correction process for calibrating a light/camera pair.

FIG. 3B illustrates a correction process for calibrating a light/camera pair to account for assembly tolerances. In one embodiment a dark room with no other sources of illumination and a flat wall with a measured distance to the devices is provided. Given the expected relative pose of the camera to light, taking an intensity image from the camera should give a 2D Gaussian distribution based on the light attenuation parameters and the measured geometry. The difference between the expected center 314 and actual center 312, along with scale and aspect ratio provide four parameters that can constrain the corrected 6-Degree of Freedom (DOF) relative pose between the light and the camera. Repeating the process for a few angles and distances allows for a linear optimization to constrain the remaining two parameters. Typically, most light models will only require 5-DOF between the camera and the light (3 for position, 2 for orientation) since the light source is expected to be symmetric about its yaw. In addition, not all camera/light pairs can necessarily be calibrated if the field of view of the camera does not intersect the center region of the light source within a reasonably short distance.

Figure 3C:
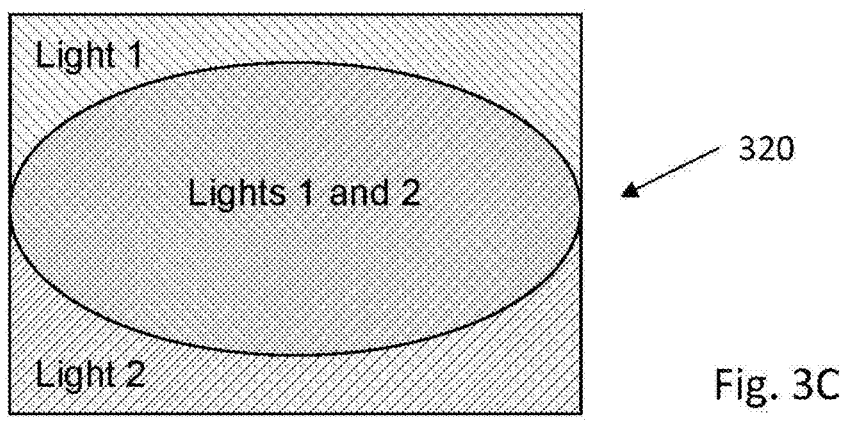
FIG. 3C illustrates camera frame and predicted pixel level illumination across the sensor.

FIG. 3C illustrates camera frame and predicted pixel level illumination across a camera sensor. To update the intensity of each of the two light sources (LIGHT 1 and LIGHT 2), a desired intensity change in each camera and in each pixel is determined. The intensity change to each light source can be back-propagated based on the relative fraction of intensity on the pixel from each light source. For each source, sum over the individual contribution from each camera pixel to determine the net illumination change for the next camera frame.

Figure 4A:
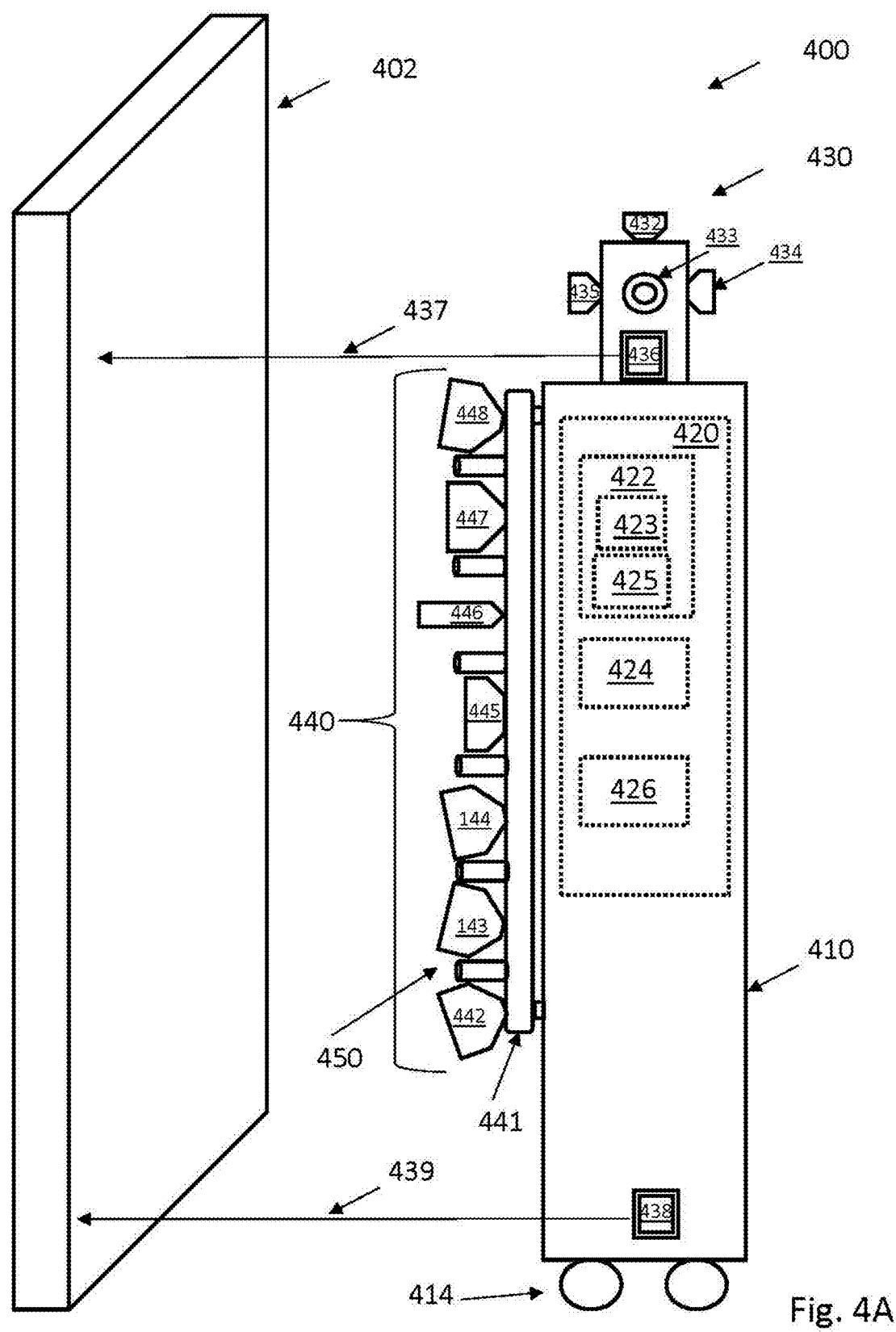
FIG. 4A is an illustration of a camera system mounted on a movable base to track product changes in aisle shelves or other suitable targets.

FIG. 4A is an illustration of an inventory monitoring camera system 400 with features that support low glare panoramas. The inventory monitoring camera system 400 can be mounted on a movable base 410 (with drive wheels 414) to track product changes in aisle shelves or other targets 402. The movable base 410 is an autonomous robot having a navigation and object sensing suite 430 that is capable of independently navigating and moving throughout a building. The autonomous robot has multiple cameras 440 attached to movable base 410 by a vertically extending camera support 440. Lights 450 are positioned near each camera to direct light toward target 402. The object sensing suite includes forward (433), side (434 and 435), top (432) and rear (not shown) image sensors to aid in object detection, localization, and navigation. Additional sensors such as laser ranging units 436 and 438 (and respective laser scanning beams 437 and 439) also form a part of the sensor suite that is useful for accurate distance determination. In certain embodiments, image sensors can be depth sensors that project an infrared mesh overlay that allows estimation of object distance in an image, or that infer depth from the time of flight of light reflecting off the target. In other embodiments, simple cameras and various image processing algorithms for identifying object position and location can be used. For selected applications, ultrasonic sensors, radar systems, magnetometers or the like can be used to aid in navigation. In still other embodiments, sensors capable of detecting electromagnetic, light, or other location beacons can be useful for precise positioning of the autonomous robot.

As seen in FIG. 4A, various representative camera types useful for constructing an updateable realogram are shown. As previously noted, a realogram can use camera derived images to produce an updateable map of product or inventory position. Typically, one or more shelf units (e.g. target 402) would be imaged by a diverse set of camera types, including downwardly (442 and 444) or upwardly (443 and 448) fixed focal length cameras that cover a defined field less than the whole of a target shelf unit; a wide field camera 445 to provide greater photographic coverage than the fixed focal length cameras; and a narrow field, zoomable telephoto 446 to capture bar codes, product identification numbers, and shelf labels. Alternatively, a high resolution, tilt controllable camera can be used to identify shelf labels. These camera 440 derived images can be stitched together, with products in the images identified, and position determined.

To simplify image processing and provide accurate results, the multiple cameras are typically positioned a set distance from the targeted shelves during the inspection process. The shelves can be illuminated with LED or other directable lights 450 positioned on or near the cameras. The multiple cameras can be linearly mounted in vertical, horizontal, or other suitable orientation on a camera support. In some embodiments, to reduce costs, multiple cameras are fixedly mounted on a camera support. Such cameras can be arranged to point upward, downward, or level with respect to the camera support and the shelves. This advantageously permits a reduction in glare from products having highly reflective surfaces, since multiple cameras pointed in slightly different directions can result in at least one image with little or no glare.

Electronic control unit 420 contains an autonomous robot sensing and navigation control module 424 that manages robot responses. Robot position localization may utilize external markers and fiducials, or rely solely on localization information provided by robot-mounted sensors. Sensors for position determination include previously noted imaging, optical, ultrasonic sonar, radar, Lidar, Time of Flight, structured light, or other means of measuring distance between the robot and the environment, or incremental distance traveled by the mobile base, using techniques that include but are not limited to triangulation, visual flow, visual odometry and wheel odometry.

Electronic control unit 420 also provides image processing using a camera control and data processing module 422. Autonomous robot sensing and navigation control module 424 manages robot responses, and communication module 426 manages data input and output. The camera control and data processing module 422 can include a separate data storage module 423 (e.g. solid state hard drives) connected to a processing module 425. The communication module 426 is connected to the processing module 425 to transfer realogram data to remote locations, including store servers or other supported camera systems, and additionally receive inventory information to aid in realogram construction. In certain embodiments, realogram data is primarily stored and images are processed within the autonomous robot. Advantageously, this reduces data transfer requirements, and permits operation even when local or cloud servers are not available.

Figure 4B:
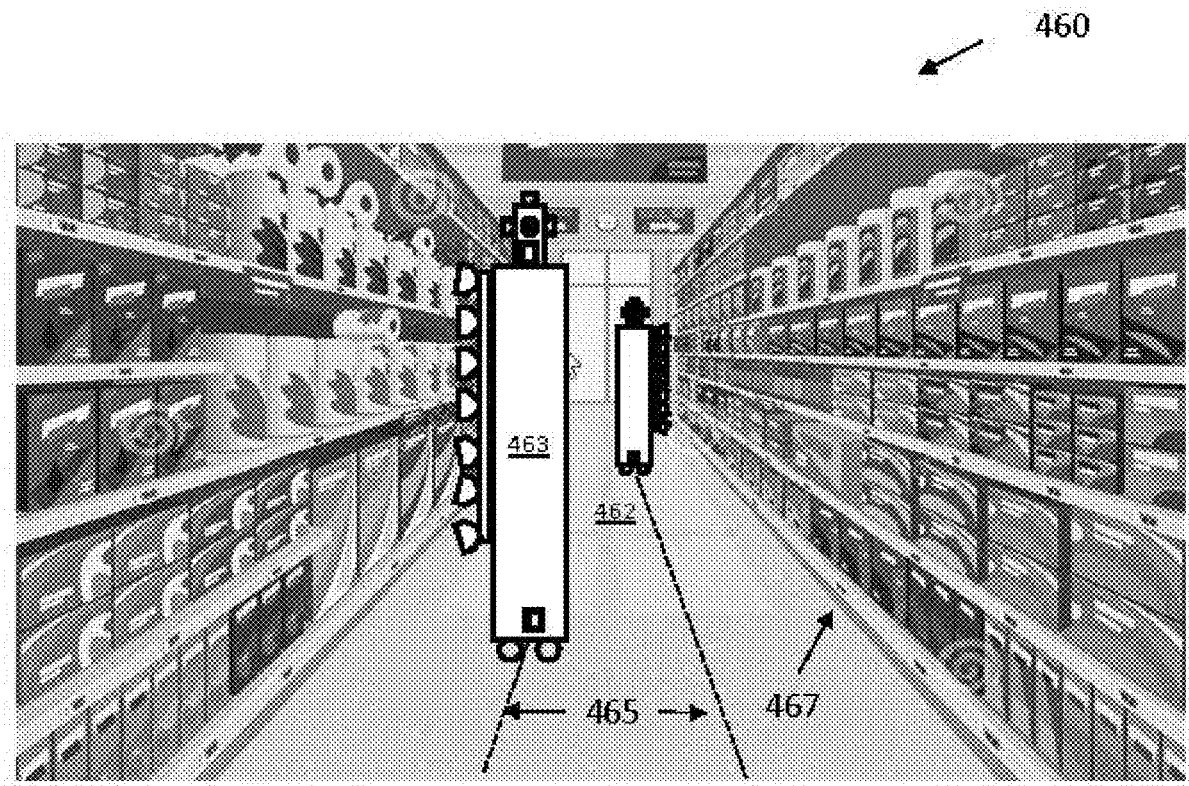
FIG. 4B is a cartoon illustrating two autonomous robots inspecting opposite shelves in an aisle.

FIG. 4B is a cartoon 460 illustrating two autonomous robots 462 and 463, similar to that discussed with respect to FIG. 4A, inspecting opposite shelves 467 in an aisle. As shown, each robot follows path 465 along the length of an aisle, with multiple cameras capturing images of the shelves 467 while using the previously discussed glare reduction method and system.

In some embodiments, the robots 462 and 463 support at least one range finding sensor to measure distance between the multiple cameras and the shelves and products on shelves, with an accuracy between about 5 cm and 4 mm. This can be used to improve illumination estimates, as well as for robot navigation. Using absolute location sensors, relative distance measurements to the shelves, triangulation to a known landmark, conventional simultaneous localization and mapping (SLAM) methodologies, or relying on beacons positioned at known locations in a blueprint or a previously built map, the robots 462 and 463 can move along a path generally parallel to a shelves 467. As the robots move, vertically positioned cameras are synchronized to simultaneously capture images of the shelves 467. In certain embodiments, a depth map of the shelves and products is created by measuring distances from the shelf cameras to the shelves and products over the length of the shelving unit using image depth sensors and or laser ranging instrumentation. Using available information, consecutive images can be stitched together to create a panorama that spans an entire shelving unit. The images can be first stitched vertically among all the cameras, and then horizontally and incrementally stitched with each new consecutive set of vertical images as the robots 462 and 463 move along an aisle. Once a stitched image has been created, a realogram based on or derived from the stitched image and suitable for product mapping can be created or updated.

Inventory data can include but is not limited to an inventory database capable of storing data on a plurality of products, each product associated with a product type, product dimensions, a product 3D model, a product image and a current product shelf inventory count and number of facings. Realograms captured and created at different times can be stored, and data analysis used to improve estimates of product availability. In certain embodiments, frequency of realogram creation can be increased or reduced, and changes to robot navigation being determined.

The communication system can include connections to both a wired or wireless connect subsystem for interaction with devices such as servers, desktop computers, laptops, tablets, or smart phones. Data and control signals can be received, generated, or transported between varieties of external data sources, including wireless networks, personal area networks, cellular networks, the Internet, or cloud mediated data sources. In addition, sources of local data (e.g. a hard drive, solid state drive, flash memory, or any other suitable memory, including dynamic memory, such as SRAM or DRAM) that can allow for local data storage of user-specified preferences or protocols. In one particular embodiment, multiple communication systems can be provided. For example, a direct Wi-Fi connection (802.11b/g/n) can be used as well as a separate 4G cellular connection.

Remote server can include, but is not limited to servers, desktop computers, laptops, tablets, or smart phones. Remote server embodiments may also be implemented in cloud computing environments. Cloud computing may be defined as a model for enabling ubiquitous, convenient, on-demand network access to a shared pool of configurable computing resources (e.g., networks, servers, storage, applications, and services) A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

Realogram updating can begin when a robot moves to an identified position and proceeds along an aisle path at a predetermined distance. If the path is blocked by people or objects, the robot can wait till the path is unobstructed, begin movement and slow down or wait as it nears the obstruction, move along the path until required to divert around the object before reacquiring the path, or simply select an alternative aisle.

Multiple images can be captured and stitched together. These stitched images, along with depth information created by a laser ranging system, an infrared depth sensor, or similar system capable of distinguishing depth at a centimeter or less scale, are used to create a realogram. The realogram use shelf labels, bar codes, and product identification databases to identify products, localize product placement, estimate product count, count the number of product facings, or even identify or locate missing product. This information is communicated to a remote server for use by, for example, store managers, stocking employees, or customer assistant representatives. Additionally, in realogram or other information received from other robots, from updated product databases, or from other stores can be used to update or assist in creation of subsequent realograms.

Figures 5A, 5B:
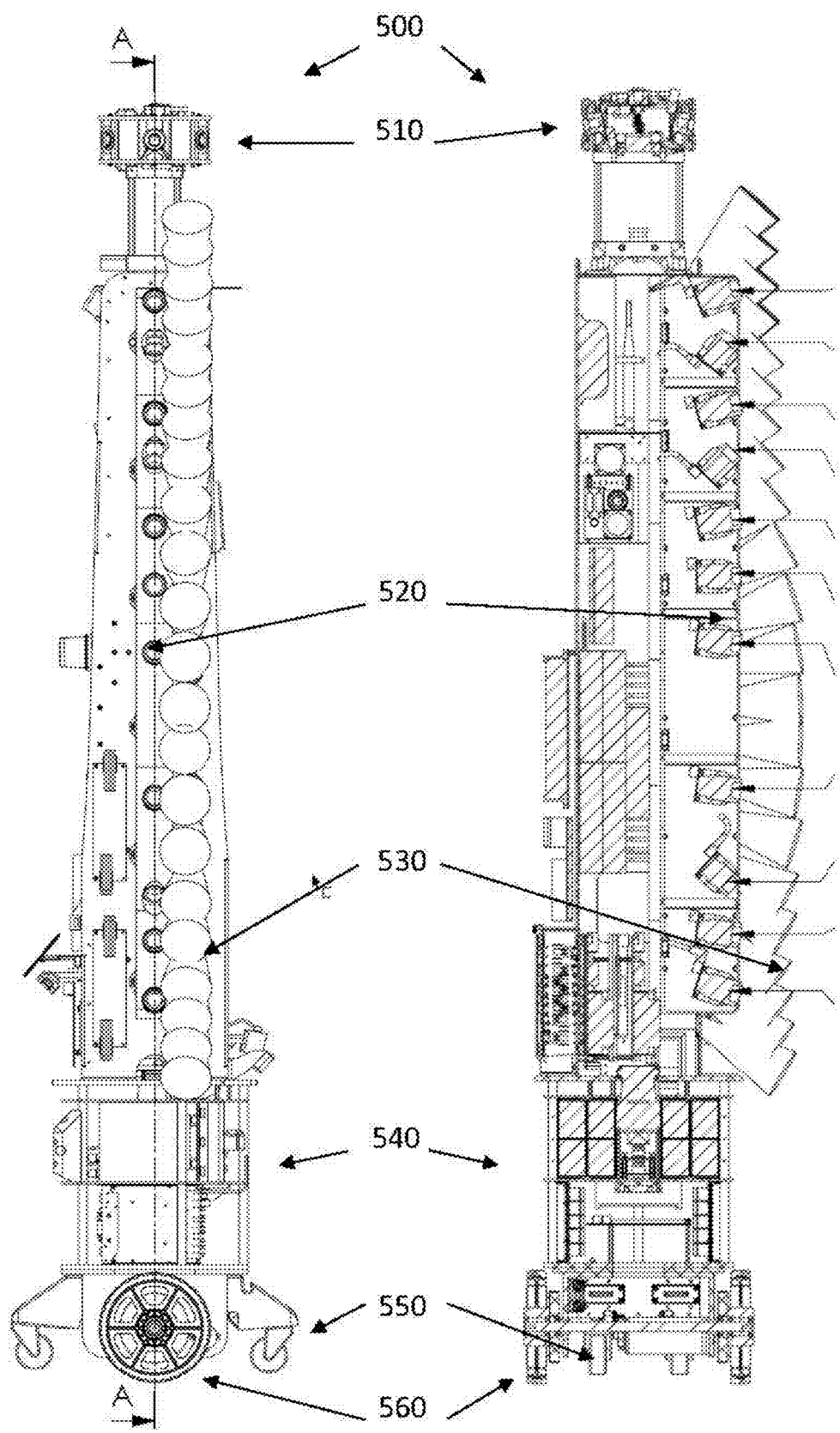
FIGS. 5A and B are respectively examples in side view and cross section of an autonomous robot capable of acting as a mobile base for a camera system.

FIGS. 5A and B are respectively examples in side view and cross section of an autonomous robot 500 capable of acting as a mobile base for a camera system in having a glare reduction system accordance with this disclosure. The robot navigation and sensing unit includes a top mount sensor module 510 with a number of forward, side, rear, and top mounted cameras. A vertically aligned array of lights 520 is sited next to a vertically arranged line of cameras 530, and both are supported by a drive base 540 that includes control electronics, power, and docking interconnects. Mobility is provided by drive wheels 560, and stability is improved by caster wheels 550.

Figure 6:
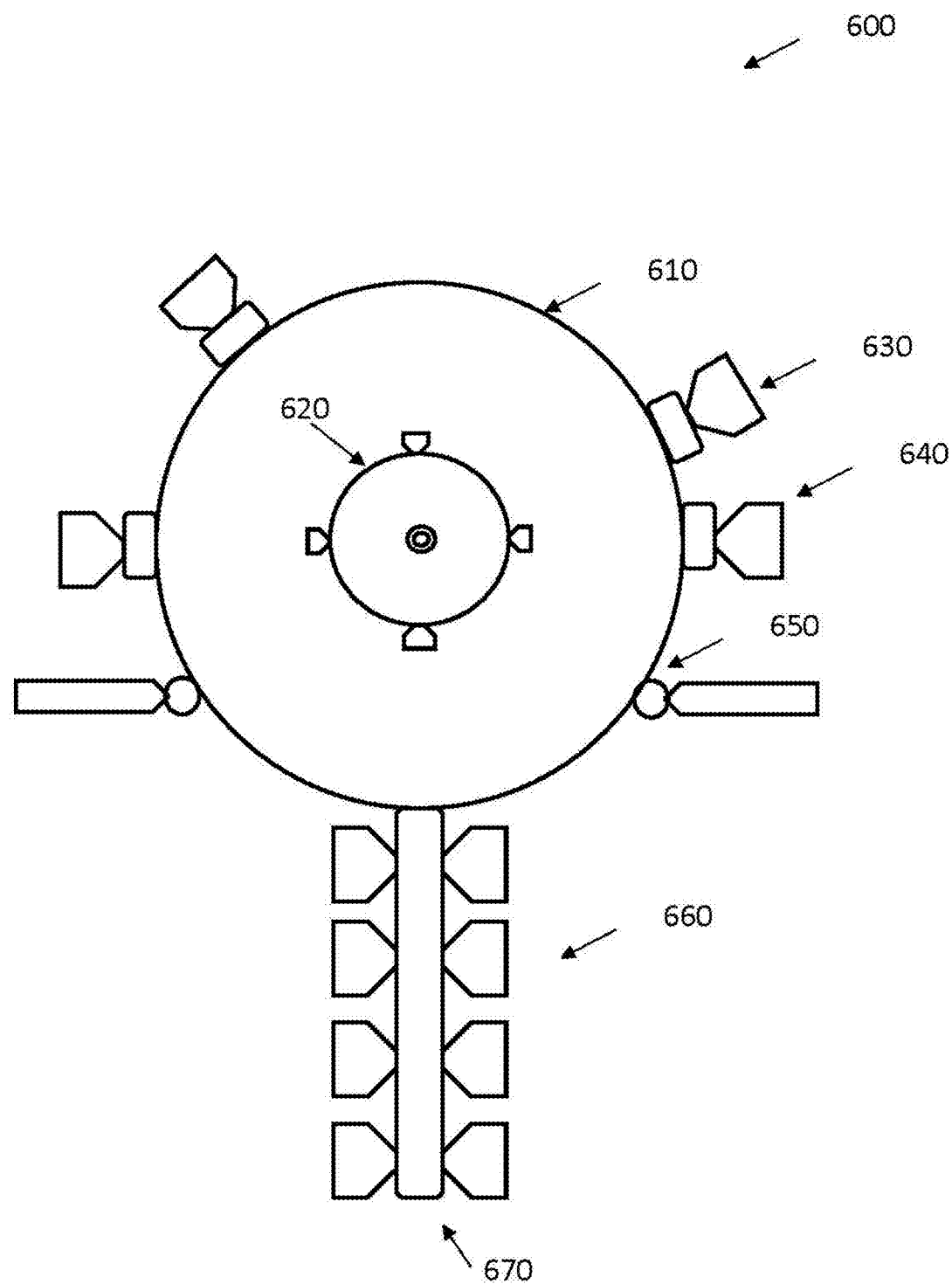
FIG. 6 is a top view, looking down, of various possible camera support sites on a mobile base.

FIG. 6 is a top view, looking down, of camera platform 600 operable in conjunction with a glare reduction system according to this disclosure. Illustrated are various possible camera support sites situated on a mobile base 610. The mobile base 610 has a top mounted camera and sensor suite 620 (optionally viewing over 360 degrees) to aid in positioning and navigating the mobile base 610 with respect to shelves in a retail store or warehouse aisle, or to capture 360-deg or spherical views of the environment. Fixedly mounted cameras 630 and 640 can be positioned to point at a perpendicular angle with respect to mobile base motion (640) or slightly angle forward (630). In certain embodiments, a controllable gimble or tilt mount (650) can be used to point a camera in a desired direction. In other embodiments, a boom 670, horizontally extending from the mobile base 610, can be used to support multiple linearly extending cameras that are directed to simultaneously capture images from each side of an aisle. In still other embodiments, two-dimensional arrays of cameras or 360 degree cameras mounted at various positions on the mobile base 610 or camera platform 600 can be used.

Figure 7A:
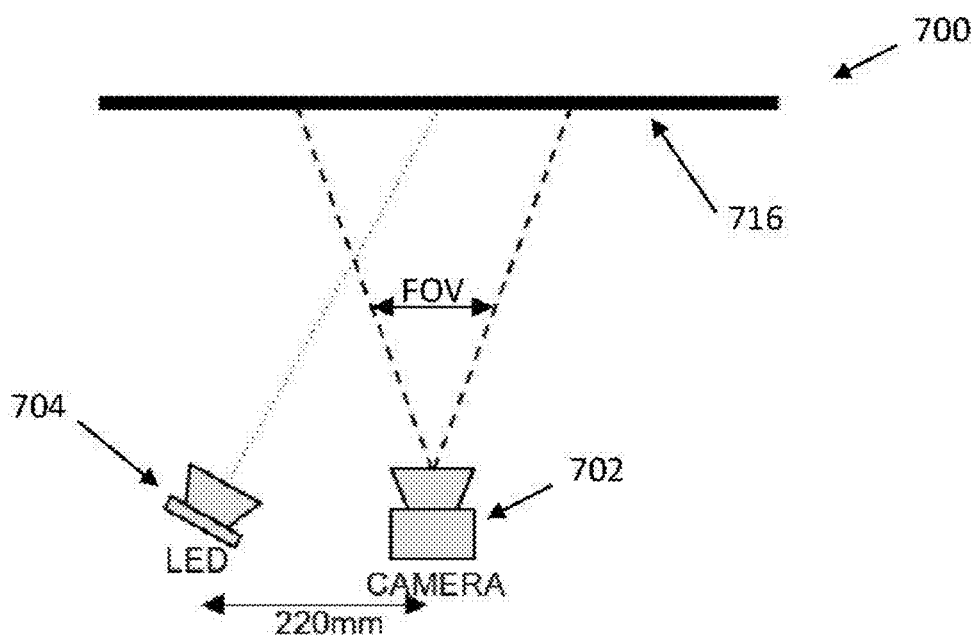
FIGS. 7A and 7B are respectively examples of an LED and a camera rotated about the vertical axis.
Figure 7B:
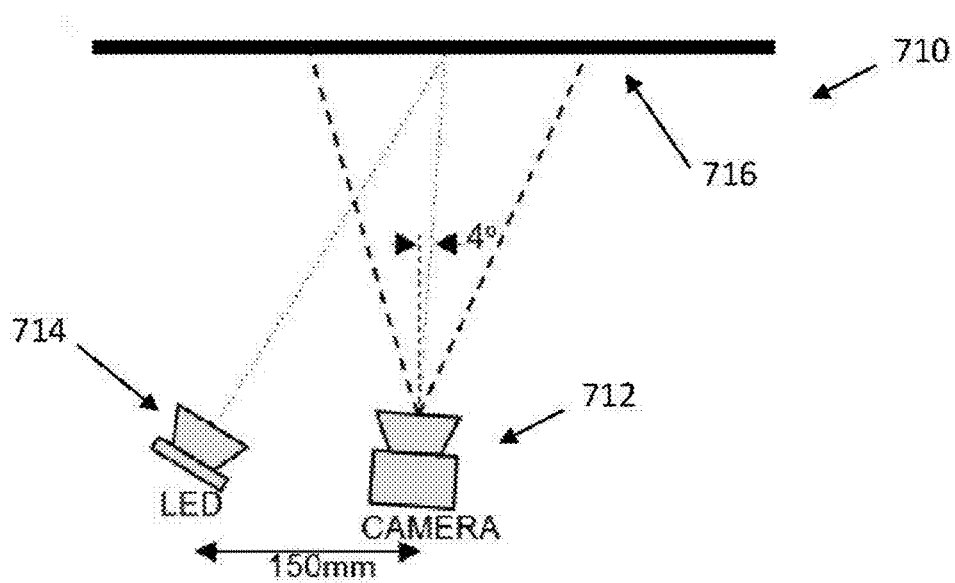

FIGS. 7A and 7B are respectively examples of an LED and a camera rotated about the vertical axis. In both embodiments, the LED lighting is positioned such that the image of the LED reflected by a shelf and its supported products is not within the field of view of the camera. This may be accomplished by (a) increasing the separation between the LEDs and the cameras, (b) rotating the camera away from the LEDs, or (c) some combination of both approaches. Since angling the cameras will negatively impact the imaging performance by reducing the pixel density on the shelf, small rotation angles of less than 10 degrees are typically used.

As seen in FIG. 7A, a camera/LED system 700 suitable for mounting on a camera support includes a camera 702 and LED 704. The camera 702 and LED 704 are separated by at least 220 mm (e.g.in the direction of robot travel, for those embodiments mounted on an autonomous robot). The camera 702 is pointed directly towards shelf. The LED 704 must be rotated about the vertical axis such that it points towards the center of the camera's field of view (FOV) at a nominal defined tracking distance.

As seen in FIG. 7B, a camera/LED system 710 suitable for mounting on a camera support includes a camera 712 and LED 714. The camera 712 and LED 714 are separated by at least 150 mm (e.g. in the direction of robot travel, for those embodiments mounted on an autonomous robot). The camera 712 is pointed towards shelf 716 and rotated about the vertical axis (by 4.0 degrees in this particular embodiment, with less than 10 degrees rotation being typical) away from normal with respect to the target shelf. The LED 714 can be rotated about the vertical axis such that it points towards the center of the camera's field of view at a nominal defined tracking distance. Advantageously, as compared to the embodiment discussed with respect to FIG. 7A, this embodiment results in slightly better lighting consistency between near and far tracking distances.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:
1. A method comprising:
capturing a first image of an inventory item at a camera mounted to a moveable base;
characterizing illumination of the first image;
moving the moveable base to a new position;
capturing a second image of the inventory item at the camera subsequent to moving the moveable base to the new position;
characterizing illumination of the second image;
stitching together the first image and the second image into a panoramic image of the inventory item, including:
computing image overlap between the first image and the second image based on portion of the first image overlapping with a portion of the second image;
comparing the illumination of the overlap in the first image to the illumination of the overlap in the second image;
determining that one of the image overlaps from among the first and second image overlaps has reduced glare relative to the other of the image overlaps from among the first and second image overlaps based on the comparison; and
blending the first and second image overlaps by having the one of the image overlaps with reduced glare contribute more to the panoramic image than the other of the image overlaps.

2. The method of claim 1, further comprising a plurality of lights mounted to the moveable base illuminating the inventory item contributing to the characterized illumination of the first image and the characterized illumination of the second image.

3. The method of claim 1, further comprising capturing one or more additional images and stitching the one or more additional images into the panoramic image.

4. The method of claim 1, wherein characterizing illumination of the first image comprises estimating illumination intensity per pixel of the first image.

5. The method of claim 4, further comprising computing glare intensity per pixel of the first image by dividing i) estimated illumination intensity at each pixel of the first image by ii) glare illumination; and
wherein comparing the illumination of the overlap in the first image to the illumination of the overlap in the second image comprises comparing the illumination of the overlap in view of the glare intensity per pixel of the first image.

6. The method of claim 5, wherein blending the first and second image overlaps comprises blending the first and second image overlaps based on a weighting function that considers the glare intensity per pixel.

7. The method of claim 1, wherein characterizing illumination of the first image comprises incorporating a reflection model.

8. The method of claim 1, wherein blending the first and second image overlaps comprises reducing light intensity in the panoramic image to a light level between camera over exposure and camera under exposure.

9. The method of claim 1, further comprising capturing a third image of the inventory item at another camera mounted to the moveable base;
wherein stitching together the first image and the second image comprises horizontally stitching the first image and the second image; and
wherein forming the panoramic image comprises vertically stitching the third image to at least one of: the first image or the second image.

10. The method of claim 1, wherein the moveable base comprises an autonomous robot, and further comprising:
moving the autonomous robot along an aisle at an essentially constant distance from shelves holding the group of inventory items;
directing the cameras and lights toward the group of inventory items; and
forming a panoramic image of the group of inventory items using the plurality of cameras and the plurality of lights; and
wherein minimizing glare creation comprises minimizing glare creation in the panoramic image.

11. The method of claim 1, further comprising positioning the first camera at a specified distance from the first light.

12. The method of claim 1, further comprising:
capturing source images at the plurality of cameras;
forming an image panorama from the source images; and
identifying glared pixels in the image panorama; and
wherein minimizing glare creation comprises de-emphasizing the glared pixels.

13. A camera system comprising:
a movable base;
a plurality of lights, including:
a first light mounted at a first location on the moveable base and directed at a first portion of a group of inventory items; and
a second light mounted at a second location on the moveable base and directed at a second portion of the group of inventory items;
a plurality of cameras, including:
a first camera mounted at a third location on the moveable base and directed at a third portion of the group of inventory items; and
a second camera mounted at a fourth location on the moveable base and directed at a fourth portion of the group of inventory items; and
an image processing module connected to the plurality of cameras and the plurality of lights and including computer-executable instructions configured to:
determine a position, an orientation, an intensity, and an intensity distribution of the first light;
determine a position, an orientation, an intensity, and an intensity distribution of the second light;
estimate a first illumination received at the first camera based on target reflectance characteristics of the third portion of the group of inventory items and relative to the determined positions, orientations, intensities, and intensity distributions of the first and second lights;
estimate a second illumination received at the second camera based on target reflectance characteristics of the fourth portion of the group of inventory items and relative to the determined positions, orientations, intensities, and intensity distributions of the first and second lights; and
based on the first estimated illumination and the second estimated illumination, minimize glare creation in images captured by the plurality of cameras including individually reorienting: at least one of the plurality of lights or at least one of the plurality of cameras.

14. The camera system of claim 13, wherein the image processing module further comprises computer executable instructions configured to estimate a first illumination by computing glare intensity per pixel by dividing i) estimated illumination intensity at each camera pixel of the first camera by ii) glare illumination.

15. The camera system of claim 13, wherein the movable base further comprises a manually guidable cart.

16. The camera system of claim 13, wherein the movable base further comprises an autonomous robot.

17. The camera system of claim 13, wherein the plurality of cameras are linearly mounted on a camera support.

18. The camera system of claim 13, wherein the plurality of cameras comprise a camera fixedly mounted on a camera support.

19. The camera system of claim 13, wherein the plurality of cameras comprise a zoom camera.

20. The camera system of claim 13, wherein the plurality of cameras comprise a downward directed camera and an upward directed camera.

21. The camera system of claim 13, wherein the plurality of cameras include at least one of: a wide field camera, a fixed camera, and a movable camera having a resolution sufficient to read shelf attached inventory information from the group of inventory items.

22. The camera system of claim 13, further comprising
a data storage module connected to the image processing module and able to store realograms; and
a communication module connected to the processing module to transfer realogram data to remote locations and receive inventory information to aid in realogram construction.

23. A method comprising:
determining a position, an orientation, an intensity, and an intensity distribution of a first light mounted at a first location on a moveable base and directed at a first portion of a group of inventory items, the first light included in a plurality of lights mounted to a moveable base;

determining a position, an orientation, an intensity, and an intensity distribution of a second rotatable light mounted at a second location on the movable base and directed at the at second portion of the group of inventory items, the second light included in the plurality of lights;

estimating a first illumination received by a first camera mounted at a third location on the movable base based on target reflectance characteristics of a third portion of the group of inventory items and relative to the determined positions, orientations, intensities, and intensity distributions of the first light and the second rotatable light, the first camera included in a plurality of cameras mounted to the moveable base;

estimating a second illumination received at a second rotatable camera mounted at a fourth location on the moveable base based on target reflectance characteristics of a fourth portion of the group of inventory items and relative to the determined positions, orientations, intensities, and intensity distributions of the first light and the second rotatable light, the second rotatable camera included in the plurality of cameras; and based on the first estimated illumination and the second estimated illumination, minimizing glare creation in images captured by the plurality of cameras, including rotating at least one of: the second rotatable light or the second rotatable camera.

24. The method of claim 23, further comprising rotating the second rotatable light at a rotational angle with respect to the first camera.

25. The method of claim 23, further comprising rotating the second rotatable camera at a rotational angle with respect to the group of inventory items.

* * * * *